(12) United States Patent
Michalski et al.

(10) Patent No.: US 8,397,566 B2
(45) Date of Patent: Mar. 19, 2013

(54) APPARATUS FOR TRANSFERRING HIGH-FREQUENCY SIGNALS COMPRISING OVERLAPPING COUPLING REGIONS THAT ARE SERIALLY CONNECTED

(75) Inventors: Bernhard Michalski, Maulburg (DE); Qi Chen, Maulburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 100 days.

(21) Appl. No.: 11/659,505

(22) PCT Filed: Jul. 7, 2005

(86) PCT No.: PCT/EP2005/053254
§ 371 (c)(1),
(2), (4) Date: Nov. 13, 2007

(87) PCT Pub. No.: WO2006/015920
PCT Pub. Date: Feb. 16, 2006

(65) Prior Publication Data
US 2008/0303611 A1    Dec. 11, 2008

(30) Foreign Application Priority Data
Aug. 6, 2004 (DE) .................... 10 2004 038 574

(51) Int. Cl.
*G01F 23/28* (2006.01)
*H01P 5/02* (2006.01)

(52) U.S. Cl. ......... 73/290 R; 333/24 C; 333/33; 333/34; 333/260

(58) Field of Classification Search .............. 333/33, 333/34, 246, 260, 24 C; 73/290 R
See application file for complete search history.

(56) References Cited

U.S. PATENT DOCUMENTS

| | | | | |
|---|---|---|---|---|
| 3,760,302 A | * | 9/1973 | Cohn | ............................ 333/204 |
| 4,680,557 A | | 7/1987 | Compton | |
| 5,057,798 A | * | 10/1991 | Moye et al. | ...................... 333/33 |

(Continued)

FOREIGN PATENT DOCUMENTS

| | | |
|---|---|---|
| DE | 32 28 993 A1 | 2/1984 |
| DE | 689 16 594 T2 | 3/1995 |
| DE | 195 19 724 C1 | 8/1996 |
| DE | 103 28 183 A1 | 1/2004 |
| EP | 0 354 524 | 2/1990 |

(Continued)

OTHER PUBLICATIONS

K. Sachse et al., "Novel, Multiplayer Coupled-Line Structures and Their Circuit Applications", Microwaves, Radar and Wireless Communications, 13th International Conference on May 22-24, 2000, New Jersey, IEEE, vol. 3, pp. 131-155, XP010537480.

*Primary Examiner* — Benny Lee
(74) *Attorney, Agent, or Firm* — Bacon & Thomas, PLLC

(57) ABSTRACT

An apparatus for the transfer of broadband, high-frequency signals of a center wavelength ($\lambda_c$), including a conductor structure, which includes at least one signal path and two reference paths arranged symmetrically to the signal path. Together the conductor structure and the two reference paths form a coplanar line, with the conductor structure being arranged on two oppositely lying sides of at least one dielectric substrate layer of a predetermined thickness in such a manner that the conductor structure overlaps in predetermined coupling regions, whereby the coupling region of the conductor structure transfers the high-frequency signals by an electromagnetic coupling, wherein the thickness of the substrate layer (18) is smaller than $\lambda_c/4$, and wherein multiple electromagnetic couplings are arranged serially one after the other. The apparatus enables a galvanic isolation having good transfer properties in the case of frequencies greater than 6 GHz.

6 Claims, 3 Drawing Sheets

U.S. PATENT DOCUMENTS

| | | | |
|---|---|---|---|
| 5,823,791 A * | 10/1998 | Bellantoni et al. | 439/63 |
| 6,023,211 A * | 2/2000 | Somei | 333/246 |
| 6,356,173 B1 * | 3/2002 | Nagata et al. | 333/247 |
| 7,315,223 B2 * | 1/2008 | Margomenos | 333/34 |
| 2002/0084514 A1 | 7/2002 | Maetani | |
| 2003/0168674 A1 * | 9/2003 | Muller et al. | 257/200 |

FOREIGN PATENT DOCUMENTS

| | | |
|---|---|---|
| EP | 0 882 95509 | 12/1998 |
| JP | 2003-008310 | 1/2003 |
| RU | 2 101 808 C1 | 1/1998 |
| WO | WO 01/43223 A1 | 6/2001 |

* cited by examiner

APPARATUS FOR TRANSFERRING HIGH-FREQUENCY SIGNALS COMPRISING OVERLAPPING COUPLING REGIONS THAT ARE SERIALLY CONNECTED

TECHNICAL FIELD

The invention relates to an apparatus for transferring broadband, high-frequency signals characterized by a center wavelength.

BACKGROUND DISCUSSION

The apparatus includes a conductor structure with at least one signal path and two reference paths arranged symmetrically to the signal path. The signal path and the two reference paths together form a coplanar line. The conductor structure is arranged on two oppositely lying sides of at least one dielectric substrate layer of a predetermined thickness in such a manner that the conductor structure overlaps in predetermined coupling regions, whereby the coupling regions of the conductor structure transfer the high-frequency signals by an electromagnetic coupling.

This type of galvanic isolation is found, for example, in measuring devices of process measurements technology. Such measuring devices are used frequently, in automation- and process-control-technology, for measuring a process variable, such as e.g. flow, fill level, pressure, temperature or some other physical and/or chemical process variable in the course of a process. For example, Endress+Hauser produces and sells measuring devices under the mark MICROPI-LOT®, which work according to the travel-time measuring method and serve for ascertaining and/or monitoring fill level of a medium in a container. In the travel-time measuring method, for example, microwaves, respectively radar waves, or ultrasonic waves, are emitted via an antenna, and the echo waves reflected on the surface of the medium are received, following the distance-dependent travel time of the signal. From the travel-time, the fill level of the medium in a container can then be calculated. A further measuring principle, of a multitude of measuring methods for ascertaining the fill level in a container, is that of guided microwaves, respectively the TDR (Time Domain Reflection) measuring method. In the TDR measuring method, e.g. a high-frequency pulse is generated along a Sommerfeld surface waveguide or coaxial waveguide, and such is then partially reflected back, upon encountering a jump in the DC (dielectric constant) value of the medium surrounding the surface waveguide. From the time difference between the emission of the high-frequency pulse and receipt of the reflected echo signal, the fill level can be ascertained. The so-called FMCW (Frequency Modulated Continuous Waves) method is, likewise, performable in connection with the above principles of measurement.

The type of apparatus to which the present invention relates is used for assuring a galvanic isolation between an earth-grounded process space and a measuring device. Galvanic isolation is needed in process measurement technology, since the process space, or the elements in contact with the process, must be at earth-potential, due to the requirements of protection against explosion. The reference grounds of the measuring devices, however, mostly deviate from earth-potential. The difference between the two potentials results in a voltage lying between the earth-grounded process elements and the measuring device, whereby a current is generated. This current has the disadvantage that the lines of a reference ground are strongly loaded by current flow. This has the effect, that the temperature of a ground line can strongly increase, so that the ignition protection category "Intrinsically Safe" of the measuring device can no longer be assured.

In the case of commercial measuring devices, isolation of the electrical current circuit is mostly effected in the input region of the measuring device, i.e. the current-feeding lines and the signal lines are galvanically isolated. The galvanic isolation of the current-feeding lines is, in the case of an applied, alternating current, mostly effected via an inductive coupling by means of a transformer or via a capacitive coupling by means of capacitors. In the case of a direct-current supply of the measuring device, a direct-current converter separates the supply lines of the measuring device, or the current flowing in the lines is limited via supplementary components. Galvanic isolation of the data line, as regards the signal, is mostly effected via an optocoupler. Altogether, this form of embodiment of explosion protection in the input module of the measuring device has the disadvantage that a multitude of expensive and disturbance-susceptible components is required in connection with this galvanic isolation of the elements located in the process space from the equipment on the periphery.

For this reason, attempts have been made for a long time in the field of high-frequency technology to integrate a galvanic isolation on the high-frequency side, since, here, mostly only the signal line and reference line need to be galvanically isolated, a matter which can be implemented by means of cost-favorable, planar, waveguide technology.

In WO 03/063190 A2, a simple galvanic isolation via an HF plug connection is described for complying with the ignition protection category "Intrinsically Safe". The coaxial plug system is composed of a socket and a plug containing a separating layer for galvanic isolation. The plug can also be replaced by a semi-rigid cable. This implementation of the requirements of the ignition protection category "Intrinsic Safety" has the disadvantage that the manufacture of the galvanically isolated, plug connection is very difficulty embodied and expensive. Furthermore, the signals in these junctions of the plug connection are very strongly reflected back, respectively damped, by the geometrical jumps of the line structures in the plug system. For high frequencies, for example over 20 GHz, the galvanic isolation of the inner conductor is, for reasons of the geometry of the plug connection, no longer implementable by a simple coupling via coupling regions of the plug connection, so that the inner conductor must then be galvanically isolated by a further component, especially a capacitor.

In DE 199 58 560 A1, a form of galvanic isolation of high-frequency signals is disclosed, based on use of a slot line. In this document, two slot lines are arranged in parallel, one above the other, so that the electromagnetic radiation issued from the one slot line is coupled into the other slot line. In this way, a galvanically isolated connection is achieved between the two slot lines. The adapting of the slot lines through a dividing layer is implemented via a microstrip line.

Disadvantageous in this form of manufacture is the complicated, multilayered construction of the coupling structure, which requires a plurality of manufacturing process steps. Moreover, the slot, and microstrip, line structure has, compared with a coplanar line, a much greater dispersion, i.e. a much greater dependency of the propagation velocity of the electromagnetic waves relative to wavelength, and frequency.

In EP 0882 995 A1 EP 0882 955 A1, several types of galvanic isolation of a coplanar, conductive-trace structure are disclosed. In the case of coplanar conductor technology, three separate planar waveguides are applied alongside one another on a substrate, with the central, planar waveguide carrying the signal and the two ther planar waveguides bordering the central one and forming the shielding line. Several options for galvanic isolation of the planar waveguides are disclosed in this docuent:

The planar waveguides are separated, and a capacitor is placed in the location of separation; and the lines are again simply separated, with one line segment being placed on the oppositely lying side of the substrate and segments of the lines spatially overlap—the signal is capacitively coupled through these overlapping segments.

A disadvantage of this galvanic isolation apparatus is that these measures exhibit good coupling properties only up to a frequency region of several GHz. They are no longer sufficient for higher frequencies above about 6 to 10 GHz. The reason is that the quality of the capacitive coupling of the signal through a substrate of thickness >1 mm is too small.

SUMMARY OF THE INVENTION

An object of the invention is to enable a galvanic isolation having good transfer characteristics at frequencies greater than 6 GHz.

This object is achieved according to an embodiment of the invention by the features, that the thickness of the substrate layer is smaller than $\lambda_c/4$, and that a plurality of electromagnetic couplings are arranged serially one after the other. For the potential-free transfer of the invention of high-frequency signals of a frequency range greater than 6 GHz, a spacing of less than $\lambda_c/4$ of the injected center wavelength $\lambda_c$ of the high-frequency signal is required, in order to assure an optimum transfer of the injected signal in the planar waveguide, respectively symmetric coplanar waveguide. If, in contrast, a greater separation of the coupling regions, as above described, is selected, then the quality of the electromagnetic coupling of the high-frequency signals is very low and strong losses are experienced in the non-matched electromagnetic coupling of the high-frequency signal. Since this separation of smaller than $\lambda_c/4$ at high frequencies is not sufficient for an explosion protection regulation "Ignition Protection Type—Intrinsic Safety" (EN 50020), which specifies a minimum spacing of 1 mm, according to the invention, the galvanic isolation, respectively the electromagnetic coupling, is done multiply at spacings of less than 1 mm. In this way, it is accomplished that the standard is met, despite falling below the minimum spacing. The advantages of the arrangement of the invention can be summarized as follows: The apparatus is insensitive to external disturbing influences, is, moreover, cost-favorable to manufacture, and the standards of the Ignition Protection Type—Intrinsic Safety of Devices are met.

In an especially preferred form of embodiment of the invention, it is provided that the conductor structure has a plurality of segments, which are situated alternatingly on the two sides of the substrate. The coplanar conductor structure is divided into segments, which are applied to the two sides in a manner such that the coupling regions of the segments of the conductor structure overlap, while, at the same time, being spatially separated by the substrate. By the spatial overlapping of the coupling regions, an electromagnetic coupling is achieved for the high-frequency signals, from one segment on the one side of the HF-substrate, onto a segment on the oppositely lying side of the HF-substrate, whereby a galvanic isolation of the coplanar line is realized.

In an advantageous form of embodiment of the solution of the invention, it is provided that the breadth and length of the coupling regions of the conductor structures and/or the thickness of the substrate is so embodied for such purpose that the electromagnetic coupling of the high-frequency signal is maximum through the coupling regions and the wave resistance of the conductor structure is matched. The changing of the breadth of the conductor structures leads to a jump-like change of the line wave resistance. These wave resistance jumps are needed for impedance transformations. Therefore, via a changing of the breadth of the conductor structures and the matching of the coupling spacing of the coupling regions, the wave resistance of the transfer location is matched and a coupling of the signal exhibiting as little reflection as possible is assured.

A helpful embodiment of the apparatus of the invention provides that the substrate is an HF-substrate and that the HF-substrate is applied with the deposited guide structure onto at least one support structure. The term "HF-substrate" designates a dielectric support material that is suited for high-frequency technology, by providing properties important for high-frequency technology, such as e.g. low losses and high stability of the dielectric. The metallically conductive, conductor structures are deposited via a known coating method, e.g. vapor deposition of metal onto a high-frequency-appropriate, substrate material and are structured via a known structuring method, e.g. lithography and etching. The structuring of the conductor structure is preferably so done that the segments of conductor structure have edge regions conforming as much as possible, since discontinuities of material and shape can cause, in high-frequency technology, strong disturbances in the signal. For mechanical stabilizing of the, mostly, very thin, HF-substrate, this, together with the structured segments of the conductor structure, are placed on a support material. This support material can be e.g. a simple epoxy-resin board, such as are used in low-frequency technology.

An advantageous embodiment of the solution of the invention provides that the HF-substrate is made of at least one material of the materials groups plastics and ceramics. These materials groups have ideal electromagnetic properties for high-frequency technology and are chemically resistant, cost-favorable and simple to manufacture. In the case of the plastics, especially suitable are the partially crystalline plastic, polyetheretherketone (PEEK), and the fluorine-containing subgroup, such as e.g. polytetrafluoroethylene (PTFE), respectively TEFLON®, and perfluoroalkoxy-copolymer (PFA), and, in the case of the ceramics, the LTCC (Low Temperature Cofired Ceramics) subgroup can be named. These materials have the advantages that they are already established over a long time in high-frequency technology and that they have chemical and physical properties, such as e.g. chemical resistance and temperature resistance, which are important in process measurements technology.

In a favorable embodiment of the apparatus of the invention, it is provided that a transfer location of the high-frequency signals from the conductor structure to a coaxial plug socket is embodied abruptly or continuously, and that, between the conductor structure and the coaxial plug socket, an electrical contact is formed by a clamping apparatus, weld and/or solder or braze. The transfer of the signal from the coplanar guide-structure occurs continuously or abruptly onto a standardized coaxial plug socket or onto another form of construction of the planar waveguide. The continuous transfer location is embodied by smoothly matching the inner conductor of the coaxial plug socket to the geometry of the planar waveguide. In this way, there is only a slight geometrical jump, which causes small reflections on the lines. The continuous transfer location has, for the above reasons, the greater bandwidth, but also the greater dimensions. The electrical contacting at least of these two types of transfer locations, from one structure onto another structure, is accomplished by a clamping apparatus, a welding and/or by soldering or brazing. The clamping apparatus is embodied as a spring and/or screw, which presses the connection elements, e.g. the coaxial plug socket and the planar waveguide structures, into contact with a defined force.

An advantageous embodiment of the solution of the invention provides a stepless wave resistance transition of the symmetric coplanar line onto a microstrip line. This transition region is characterized by a location-dependent breadth of the conductor structure, e.g. it is conical in nature. By suitable choice of the function for the location-dependent breadth of the guide-structure, a reflection-poor wave resistance transition can, therefore, be achieved to provide for large bandwidths of the signal.

A very advantageous variant of the solution of the invention is to be seen in the application of through-contacting between selected segments of the conductor structure, in order to effect a conductive signal transfer between the selected segments of the conductor structure. From circuit-technical points of view, it is necessary to contact a given coupling region by way of a through-contacting, e.g. the establishing of a conductive connection by placing a metal sleeve, or pin into a bore and/or by provision of a solder bridge. The structure of the regions of the segments around the through-contacting and the through-contacting itself are embodied, such that the wave resistance of the associated geometrical jump is matched for a certain frequency range. Consequently, no significant reflections of the signal are experienced at the location of the through-contacting.

An especially advantageous, further development of the solution of the invention provides that the apparatus is integrated in a measuring device, which, via a sending and/or receiving unit, radiates a high-frequency signal into an open or closed, spatial system and/or receives the high-frequency signal from the open or closed spatial system and that, via measurement of the travel time of the emitted high-frequency signal, the fill level of a fill substance is ascertained, wherein the high-frequency signal being a microwave signal. This apparatus can be used, for example, in process measurements technology, in conjunction with measuring devices for measuring fill level. In the case of such measuring devices, it is appropriate to connect the parts of the measuring device located in the process space (container, silo), i.e. parts such as e.g. the antenna, respectively its housing, to earth potential, for reasons of explosion protection, in order that there can be no ignition-spark discharge at the antenna. If the reference potential of the measuring device is different from earth potential, an equalizing current flows. By galvanic isolation, this equalizing current between the two different potentials is suppressed.

BRIEF DESCRIPTION OF THE DRAWINGS

The invention and selected examples of embodiments will now be explained in greater detail on the basis of the appended drawings. For simplification, identical parts have been provided in the drawings with the same reference characters. The figures of the drawings show as follows.

DESCRIPTION OF THE DRAWINGS

Figure 1:
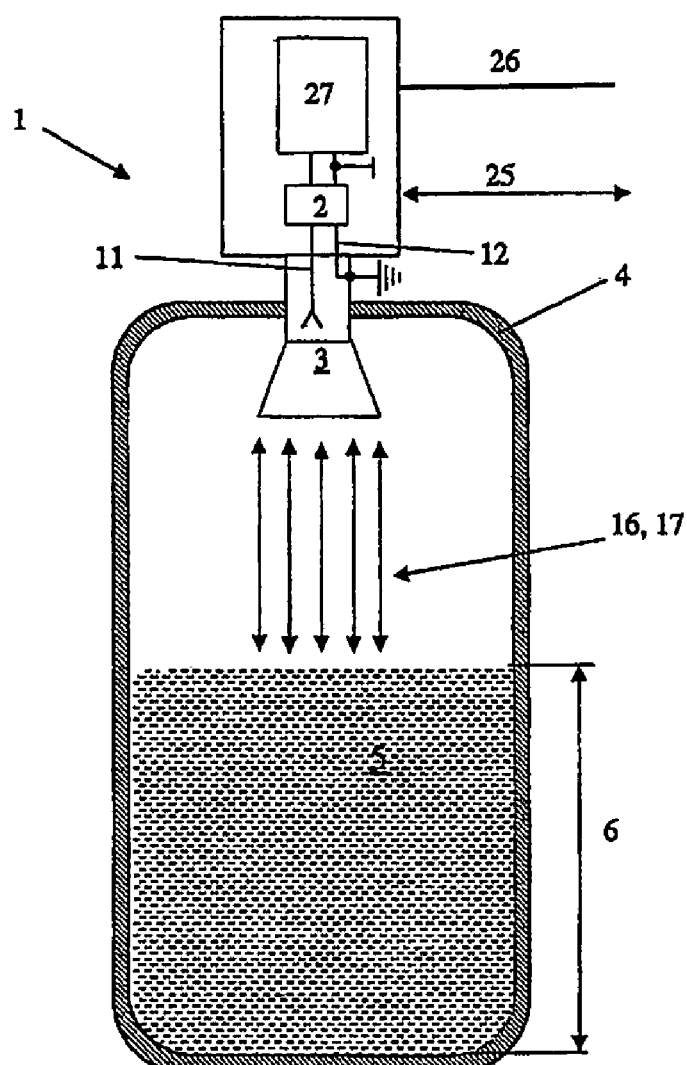
FIG. 1 a schematic, total view of a measuring device mounted on a container and equipped with the apparatus for galvanic isolation.

FIG. 1 shows an example of application of the galvanic isolation in a process measuring system. The measuring device 1 of FIG. 1 is mounted on a container 4 and serves for ascertaining, for example according to the travel-time measuring method, the fill level 6 of a fill substance 5 in the container 4. Measuring device 1 includes a sending and/or receiving unit 3, via which the microwave signals 17 are radiated into free space, and reflected on a surface in the container 4 or on a surface of the fill substance 5 and, after a certain travel time, to be received back by the sending and/or receiving unit 3. Via the travel time of the microwave signals 17, the fill level 6 of the fill substance 5 in the container 4 is ascertained. The control/evaluation unit 27 has the task of producing microwave signals 17 and of evaluating, respectively processing for measurement purposes, the received, reflected microwave signal 17. This sensing and/or receiving unit 3 is galvanically isolated by the apparatus 2 of the invention from the control/evaluation unit 27, the remaining electronics in the measuring device 1, the supply line 26 and the fieldbus 25. By the galvanic isolation and the connection to earth of the elements located in the process, there is obtained an "intrinsically safe" measuring device 1, which eliminates the danger of spark formation and, at the same time, the danger of temperature rise of electric conductors, which could otherwise lead to ignition of some explosion-capable atmosphere.

Preferably, in the illustrated case, a two-wire measuring device is involved, in the case of which the supply line 26 and the fieldbus line 25 are merged together to one line, so that only a two-wire line is needed, in order both to supply the measuring device 1 with energy and, at the same time, to provide for communications with a remote control-facility.

Apparatus 2 (FIGS. 3, 4 and 5) is usable both in the freely radiating radar measurements technology and in TDR (Time Domain Reflectometry) measurements technology wherein high-frequency signals 16 are guided on waveguides. TDR measurements technology represents an alternative method for measuring the fill level 6 in a container 4 and is not explicitly shown in FIG. 1. In the case of this measurements method, high-frequency signals 16 are guided along a waveguide into the container 4 and are reflected back due to a DC (dielectric constant) value change of the medium surrounding the waveguide. This DC value change of the medium surrounding the waveguide is caused by a phase boundary of the fill substance 5 with air in the container. From the time difference, the so-called travel-time, between the emitted high-frequency signals 16 and the received, reflected high-frequency signals 16, both traveling along the waveguide, the fill level 6 in the container 4 can be ascertained.

Figure 2:
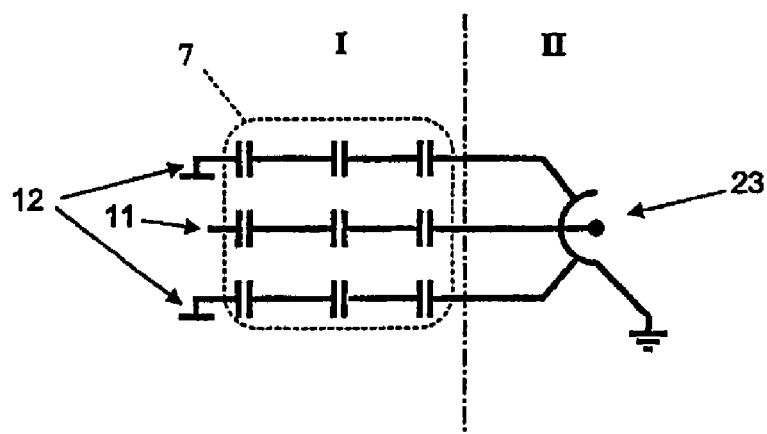
FIG. 2 a schematic view of the galvanic isolation of the signal path and the symmetric reference paths arranged on both sides.

FIG. 2 is a schematic representation of a multiple galvanic isolation in triplicate, with three coupling regions, one in the signal path 11 and two reference paths 12. By the multiple galvanic isolation, an intrinsically safe region II is separated from a non intrinsically safe region I. The region II includes an electrical contact 23. For simplifying the manner of considering the apparatus 2, the multiple galvanic isolation, respectively the electromagnetic coupling 10 through the coupling regions 9, has been represented by three series connected capacitors. At high frequencies, the overlapping regions 9 of the segments 8 (FIGS. 3, 4, 5 and 6) possess not only capacitive but also inductive properties, respectively characteristics, whereby the electromagnetic coupling 10 must be established by a complicated equivalent circuit diagram containing pluralities of capacitances and inductances.

Figure 3:
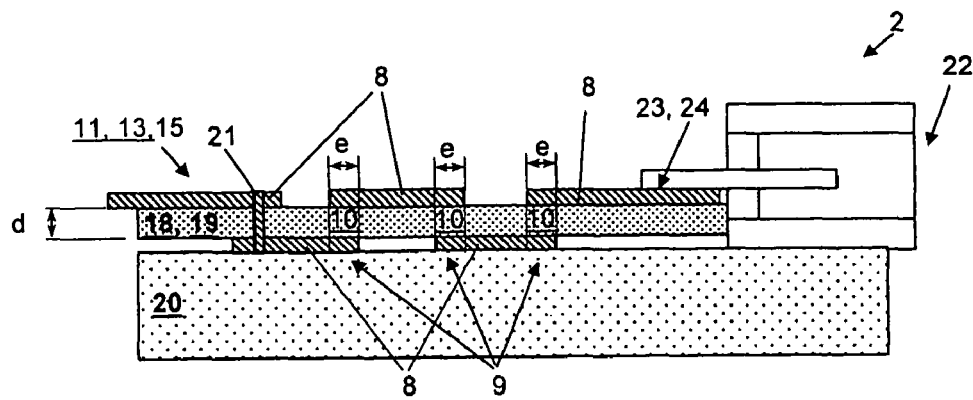
FIG. 3 a longitudinal section through a first form of embodiment of the galvanic isolation using coplanar line technology.
Figure 5:
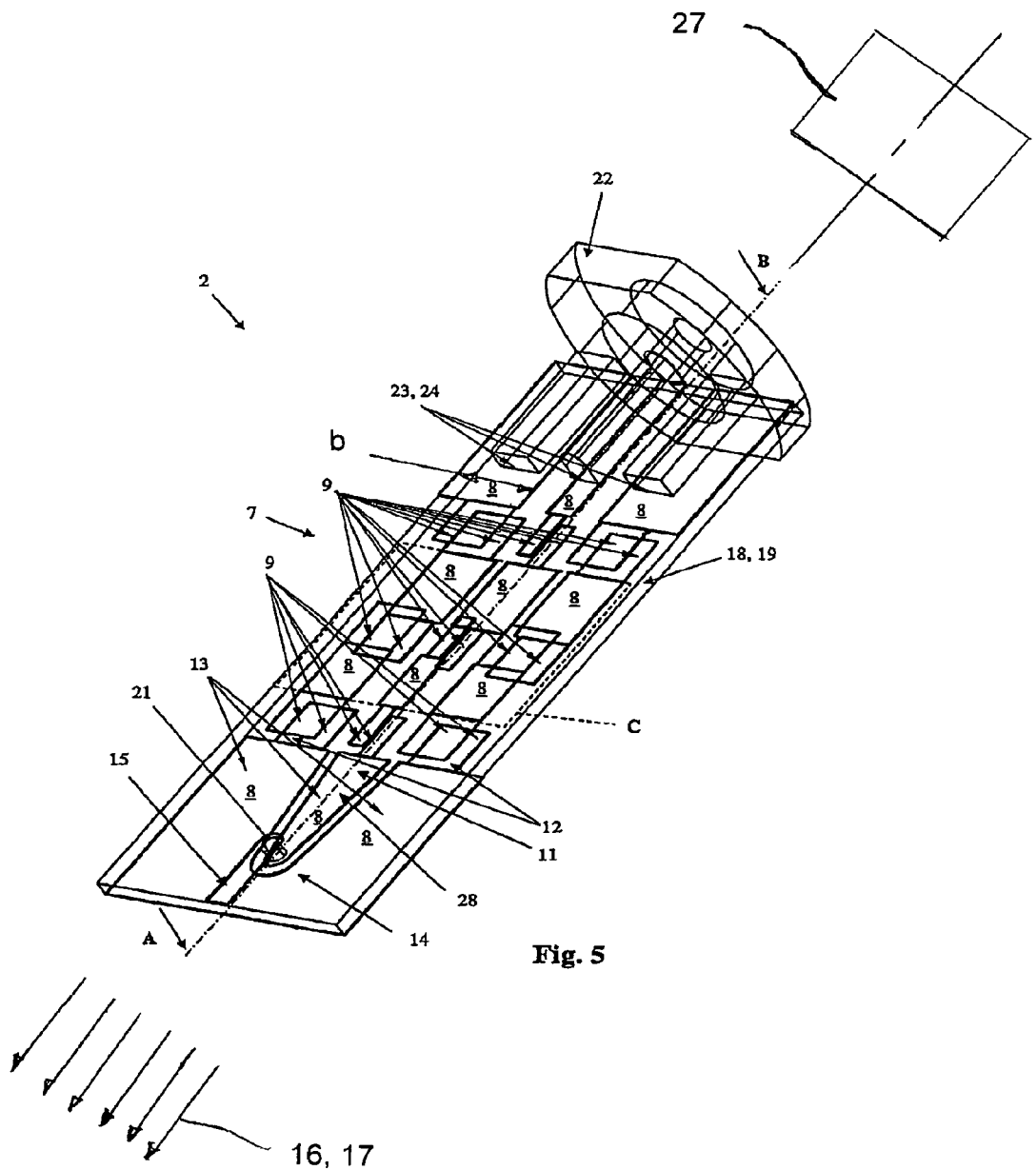
FIG. 5 a perspective, total view of the first form of embodiment shown in FIG. 3.

FIG. 3 shows a longitudinal section taken according to the cutting plane A-B of FIG. 5 to include the signal path 11 with an added support structure 20. The galvanic isolation occurs in this example of an embodiment over a number of segments 8, which are situated alternatingly on the two sides of the HF-substrate and spatially overlap in coupling regions 9. The length e of a coupling region 9 is approximately $\lambda_c/4$, since, in the case of this length e of the coupling region 9, there is, in the ideal case, no reflection of the high-frequency signal 16 at the ends of the segments. The thickness d of the HF-substrate 19 is, due to an optimized electromagnetic coupling 10 of high-frequency (i.e. frequency greater than 6 GHz) signals 16 in the coupling regions 9 of the segments 8, set at smaller than $\lambda_c/4$, which, in this example of an embodiment, corresponds to an HF-substrate 19 of e.g. TEFLON® with a thickness d of about 250 microm.

The electric transition 24 from a planar segment 8 to a connection element of a coaxial plug socket 22 occurs via soldering, brazing, clamping or welding of the two structures. This transition 24 can occur abruptly, whereby a jump in the geometry arises in the line structure 7 (FIG. 2), which causes reflections on the line structure 7, respectively changes the wave resistance of the line structure 7. These disadvantageous disturbing effects can be avoided, when the segment 8 of the line structure 7 or e.g. the inner conductor of the coaxial plug socket 22 itself has a continuous transition 24 of the structure, whereby reflection-poor wave resistance transitions of large bandwidth are achieved. Preferably, in the illustrated case, the whole construction of the conductor structure 7, together with the remaining high-frequency electronics, is embodied on the same HF-substrate 19. The term "remaining high-frequency electronics" means that part of the control and/or evaluation unit, which produces, and/or processes for measurement purposes, the high-frequency signals 16, respectively the microwave signals 17. The HF-substrate 19, including the conductor structure 7, the coaxial plug socket 22 and the remaining HF-electronics 27 is placed on a support structure 20. The apparatus 2 and the HF-electronics 27 are, for example, secured with adhesive on an LF-board, since, for example, an approximately 250 microm thick platform of Teflon is not mechanically stable. If, in contrast, a ceramic, e.g. LTCC, is used as material for an HF-substrate 19, then an additional support structure 20 can be omitted, since this substrate layer 19 alone has a good mechanical stability.

This example of an embodiment of a multiple, galvanic isolation can be manufactured very easily, since the construction of the coplanar conductor structure 7 is constructed, together with the HF-electronics 27, on the HF-substrate. The manufacture of the conductor structure 7 can, therefore, be carried out in conjunction with the standardized manufacturing process for the remaining traces of the HF-electronics, respectively control/evaluation unit 27. Alone the galvanic isolation is easily implementable by the structuring process of the conductor structures 7 and the provision of the through-contact 21, this leading to a large reduction in cost, since no added components and manufacturing processes are used for implementing the galvanic isolation. An advantage of this form of galvanic isolation utilizing the conductor structure 7 is that this construction has a broadband bandpass characteristic. By the symmetric coplanar line 13, broadband bandpass transmissions of over 15% of the center frequency, respectively center wavelength $\lambda_c$, are achieved. Moreover, the coplanar line 13 has, in contrast to other planar waveguides, such as e.g. microstrip lines 15, a much smaller dispersion, i.e. the propagation velocity of electromagnetic waves in a medium is only dependent slightly on wavelength, respectively frequency. This is very advantageous, since dispersion leads to travel-time differences for the high-frequency signals 16 on the planar waveguides as a function of frequency, whereby a travel-time measurement would not be possible with a broadband microwave pulse, since the received measurement signal can no longer be associated unequivocally with a time or traveled distance, due to the different propagation velocities of the different portions of the microwave pulse.

Figure 4:
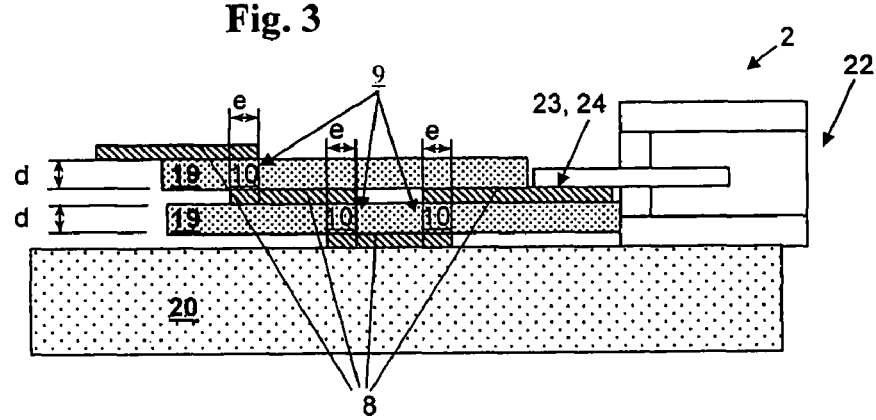
FIG. 4 a longitudinal section through a second form of embodiment of the galvanic isolation using coplanar line technology.

FIG. 4 shows, in longitudinal section, a second form of embodiment of the galvanic isolation including a support structure 20, a coaxial plug socket 22, and a transition or junction 24. In this form of embodiment, a through-contact 21 extending through the HF-substrate 19 is omitted. However, then a multilayer construction of the substrate is required, which makes manufacture of the conductor structures 7 more complicated. A further advantage is that the space needed for the multiple electromagnetic coupling 10 is less in the case of a multilayer embodiment of the HF-substrate 19, having a thickness d and overlapping lengths e. Of course, additional one or more substrate-layer forms of embodiment are optionally constructable.

FIG. 5 is a perspective view of the first form of embodiment for a galvanic isolation between an intrinsically safe region and a non-intrinsically-safe device. The embodiment has a substrate layer 18 and an HF-substrate 19. The construction will be explained on the basis of following the injected high-frequency signal 16, respectively microwave signal 17. Such is first transferred via a pressure contact 21 of a signal path 12 from an HF-electronics, respectively control/evaluation unit, 27 (which, for example, involves microstrip trace technology 15) into a symmetrical, coplanar line 13. In order to facilitate this otherwise abrupt, reflection-burdened transition 14 for the high-frequency signal 16 at a jump in the geometry of the planar wave guides at the location of the through-contact 21, a stepless wave resistance transition, respectively a taper, 28 is formed in the signal path 11 of the coplanar line 13, which enables reflection-poor wave resistance transitioning of the high-frequency signal 16, thereby providing large bandwidth. The signal path 11 and the two reference paths 12 lie parallel to one another on the underside of the HF-substrate 19 and form a coplanar line 13. On the upper side of the HF-substrate 19 are situated, accordingly, further segments 8, so that the segments 8 of the line structure 7 form spatially separated coupling regions on the different sides of the HF-substrate. Via these coupling regions, which overlap with a length e of $\lambda_c/4$, the high-frequency signals 16 are electromagnetically coupled into the, in each case, oppositely lying segments 8. The length e of the coupling regions 9 is approximately set at $\lambda_c/4$. Since the electromagnetic field does not abruptly end at a segment 8 of the conductor structure 7, the $\lambda_c/4$ transformation of the open circuits formed by the ends of the segments 8 of the conductor structure results in an electromagnetic short circuit between the two overlapping coupling regions 9. The breadth b of the coupling regions 9 is selected in such a manner that, by an abrupt change of the breadth b of the segments 8 in the areas of the coupling regions 9, a wave resistance jump is obtained. Such wave resistance jumps are needed as impedance transformations, in order to match the impedance of the segments 8 to the impedance of the electromagnetic coupling 9 through the dielectric material of the HF-substrate 19. These electromagnetic couplings 9 are embodied multiply, e.g. in first and second examples of embodiments, three times. Indicated at the last segments 8 of the symmetric, coplanar line 14 is an abrupt electrical transition 24 onto a coaxial plug socket 22. This electrical contact 23 (FIGS. 2 to 4) of the connections of the coaxial plug socket 22 can occur via a multiplicity of different methods, all having their disadvantages and advantages. For example, a soldering, brazing, clamping apparatus, or welding can be provided, which connect the planar waveguide structure with the connections of the coaxial plug socket 22. For reasons of wave resistance matching, the abrupt, reflection-burdened transition 24 of the waveguide structures can also be embodied by a continuous, reflection-poor transition 24 of the segments 8 or of the connections of the coaxial plug socket 22.

Figure 6:
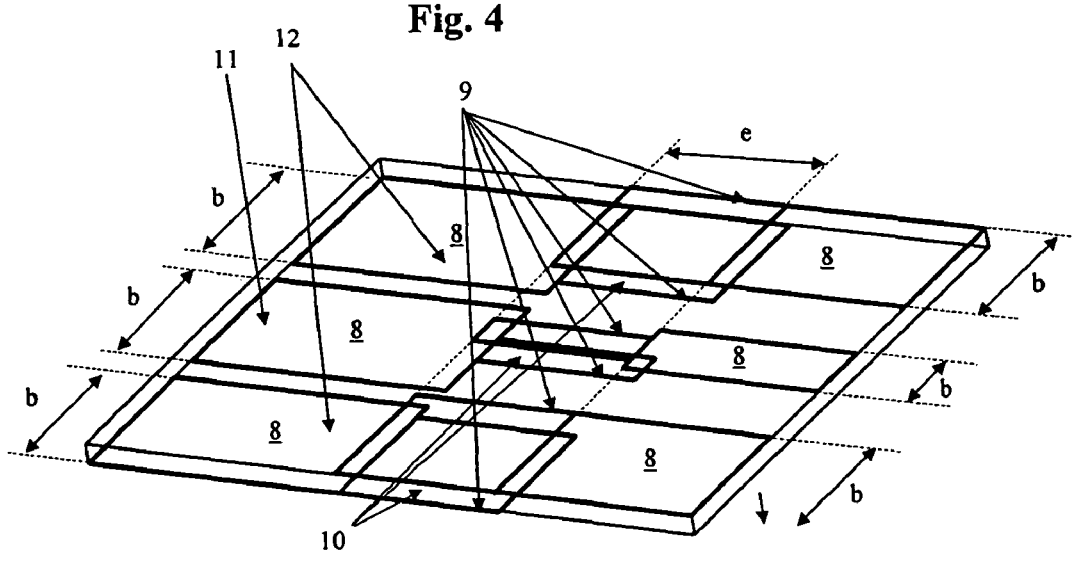
FIG. 6 an enlarged detail of the perspective, total view of the first form of embodiment shown in FIG. 5.

FIG. 6 shows the section indicated with C in FIG. 5 and provides an enlarged view of the coupling regions 9 of the segments 8 of the conductor structure 7. Shown are the signal path 11, the reference path 12, the substrate layer 18 and HF-substrate 19 and the overlapping e. Here, such can be more clearly seen, especially the changes of the breadths b of the segments 8 at the coupling regions 9. These geometrical jumps provided by the changes of the breadths b of the segments 8 form, from a high-frequency point of view, wave resistance jumps, which are used as impedance transformations. With the impedance transformations, the impedance of the segments 8 are matched to the impedance of the electromagnetic coupling 10 through the dielectric material of the HF-substrate 19.

The invention claimed is:

1. A measuring device, wherein an apparatus is integrated in said measuring device, which, via a sending and/or receiving unit, radiates broadband high-frequency signals having a center wavelength into an open or closed, spatial system, and/or receives the high-frequency signals from the open or closed, spatial system, and ascertains, via a travel-time measurement of the emitted high frequency signals, a fill level of a fill substance, the high-frequency signals are microwave signals, said apparatus comprising:
   at least one dielectric substrate layer of a predetermined thickness; and
   a conductor structure, which includes at least one signal path and two reference paths arranged symmetrically to the signal path, which together form a coplanar line, wherein:
   said conductor structure is separated into segments and said segments are arranged on two oppositely lying sides of said at least one dielectric substrate layer, in such a manner that,
   said segments of said conductor structure overlap, in predetermined coupling regions, with a predetermined breadth and predetermined length being spatially separated by said at least one dielectric substrate layer of a predetermined thickness;
   a galvanic isolation of the coplanar line is realized in such a manner that the coupling regions of said segments of the conductor structure transfer the high-frequency signals by electromagnetic coupling;
   said thickness of said at least one dielectric substrate layer being smaller than a quarter of the center wavelength $\lambda c/4$;
   said breadth of the coupling regions of the conductor structures and/or said thickness of said at least one dielectric substrate layer is/are embodied such that the electromagnetic coupling of the high-frequency signals is maximum through the coupling regions, and a wave resistance of the conductor structure is matched;
   said predetermined length of the overlaps in the coupling regions is approximately a quarter of the center wavelength; and
   at least three coupling regions of said predetermined coupling regions of electromagnetic couplings are arranged serially one after the other in each signal path and in each reference path as a multiple galvanic isolation, which separates an intrinsically safe region from a non-intrinsically-safe region in the measuring device.

2. The measuring device as claimed in claim 1, wherein: said at least one dielectric substrate layer comprises an HF-substrate and said HF-substrate with said conductor structure thereon is borne by at least one support structure.

3. The measuring device as claimed in claim 2, wherein: said HF-substrate comprises at least one plastic or ceramic material.

4. The measuring device as claimed in claim 1, wherein: a stepless wave resistance transition is formed in a transition region between said symmetric coplanar line and a microstrip line.

5. The measuring device as claimed in claim 1, wherein: between selected segments of said conductor structure, a through-contacting is provided, which effects a conductive signal transfer between said selected segments of said conductor structure.

6. The measuring device as claimed in claim 1, further comprising:
   a coaxial plug socket, wherein:
   a transition of the high-frequency signals from said conductor structure to said coaxial plug socket is embodied by an abrupt or continuous geometry change of the conductor structure or/and the coaxial plug socket; and
   an electric contact between said conductor structure and said coaxial plug socket is formed by one of: a clamping apparatus, welding and/or soldering or brazing.

* * * * *